United States Patent Office 3,109,855
Patented Nov. 5, 1963

---

3,109,855
TETRAKIS-[PENTAFLUOROPHENYL]-SILANE AND METHOD OF MAKING THE SAME
Walter J. Pummer, Rockville, Md., and Leo A. Wall, Washington, D.C., assignors to the United States of America as represented by the Secretary of the Navy
No Drawing. Original application May 3, 1960, Ser. No. 26,660, now Patent No. 3,046,313, dated July 24, 1962. Divided and this application June 26, 1961, Ser. No. 126,452
2 Claims. (Cl. 260—448.2)
(Granted under Title 35, U.S. Code (1952), sec. 266)

The invention described herein may be manufactured and used by or for the Government of the United States of America for governmental purposes without the payment of any royalties thereon or therefor.

This application is a division of application Serial Number 26,660, filed May 3, 1960, now U.S. Patent No. 3,046,313, granted July 24, 1962.

This invention relates to tetrakis-[pentafluorophenyl]-silane and a method of making the same. The product is one of a family of compounds containing the pentafluorophenyl group. Compounds containing the pentafluorophenyl group are useful as intermediates or precursors for thermal-stable or fuel-resistant polymers or lubricating liquids.

An object of the invention is the preparation of tetrakis-[pentafluorophenyl]-silane.

Other objects and many of the attendant advantages of the invention will be readily appreciated as the same becomes better understood by reference to the following detailed description.

The method of the invention includes the Grignard coupling or addition reaction. This and the Ullmann-type condensation are used to make other members of the family. The following scheme illustrates some of these reactions as applied to the making of tetrakis-[pentafluorophenyl]-silane and other compounds of the family:

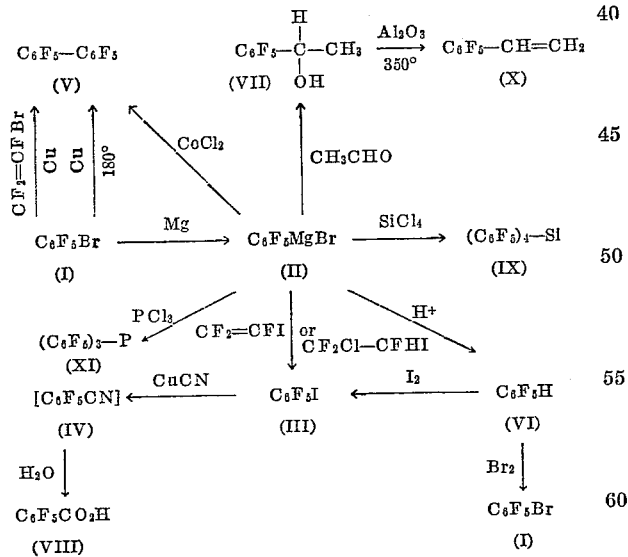

*Grignard reagent* (II).—A Grignard reagent for use in carrying out the Grignard coupling method of making tetrakis-[pentafluorophenyl]-silane is prepared in the following manner. To 1 g. (0.041 g. atom) of magnesium turnings in 10 ml. of anhydrous ether is added 1 ml. of pentafluorobromobenzene (I) and a small crystal of iodine. Local heating is applied since it is necessary to initiate the reaction. When the reaction is sufficiently in progress, the flask containing the ingredients is cooled in an ice water bath and the remainder of the compound (I) (total 10 g., 0.04 mole) is added over a half-hour period. The Grignard solution is dark brown in color. When all the magnesium appears to be consumed, the solution is allowed to come to room temperature and is stirred for an additional half hour.

The compound of this invention is tetrakis-[pentafluorophenyl]-silane. This compound is prepared as follows.

To the aforedescribed Grignard reagent prepared, however, in this case, from 24.7 g. (0.1 mole) of pentafluorobromobenzene, 2.43 g. (0.1 g. atom) of magnesium turnings in 50 ml. of anhydrous ether is added slowly 2.83 ml. (4.25 g.; 0.025 mole) of silicon tetrachloride at 0° C. When the addition is completed, the contents is stirred for one-half hour more at 0° C., then refluxed for 2½ hours more, and allowed to cool overnight. The contents is poured into 100 ml. of 6 N hydrochloric acid, and the brown solid (9 g.) is removed by filtration. After drying, the solid is sublimed at 208° C./1 mm., to yield 5.5 g. (32%) of tetrakis-[pentafluorophenyl]-silane as white short needles, M.P. 246° to 248° C. This compound is an oxidation and fuel-resistant substance.

Obviously many modifications and variations of the present invention are possible in the light of the above teachings. It is therefore to be understood that within the scope of the appended claims the invention may be practiced otherwise than as specifically described.

What is claimed is:
1. Tetrakis-[pentafluorophenyl]-silane.
2. The process of making tetrakis-[pentafluorophenyl]-silane which comprises reacting with silicon tetrachloride the Grignard reagent pentafluorophenylmagnesium bromide prepared from pentafluorobromobenzene.

References Cited in the file of this patent
FOREIGN PATENTS
1,205,608   France ---------------- Aug. 17, 1959